(No Model.)
F. H. MOORE.
APPARATUS FOR PURIFYING WATER.
No. 411,292. Patented Sept. 17, 1889.
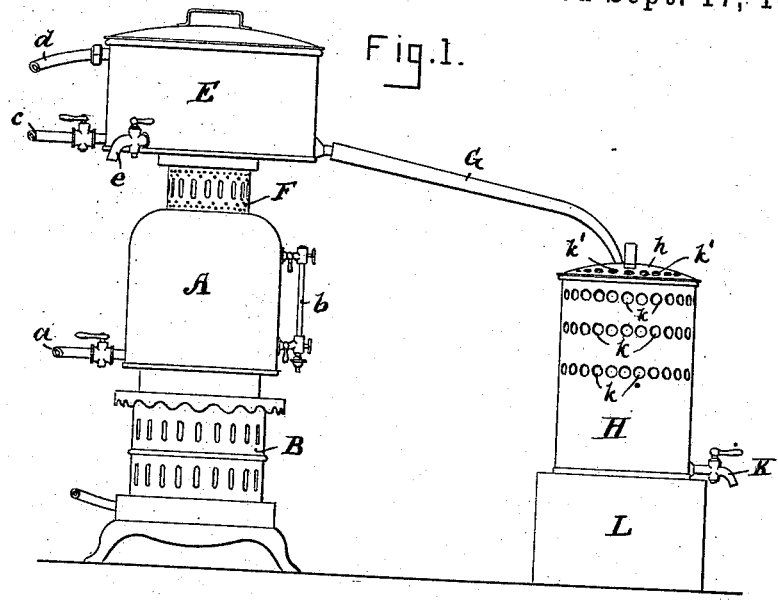
Fig. 1.
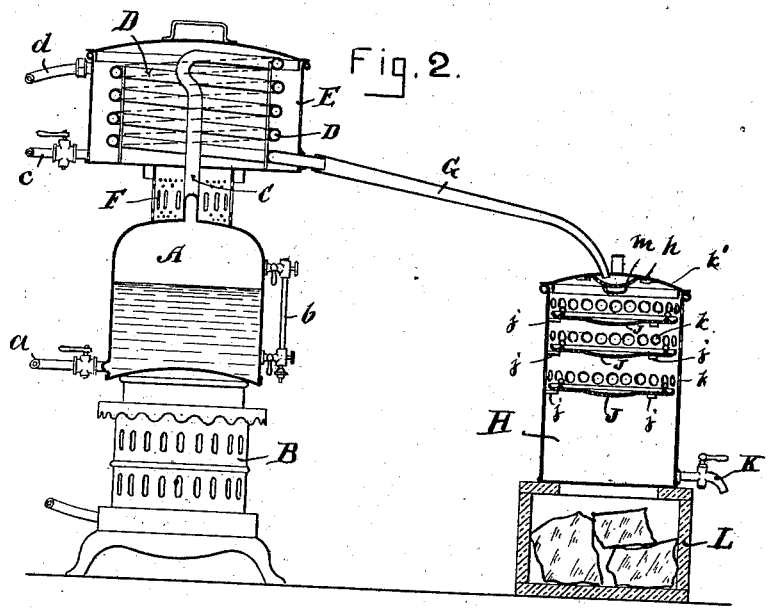
Fig. 2.
Fig. 3.
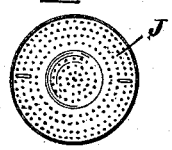
Fig. 4.
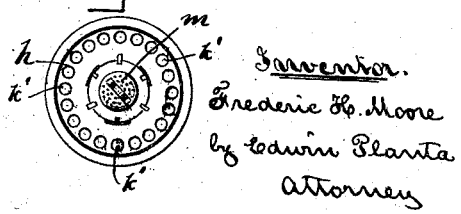
Witnesses.
Timothy G. O'Connell
George D. Reid
Inventor.
Frederic H. Moore
by Edwin Planta
Attorney

UNITED STATES PATENT OFFICE.

FREDERIC H. MOORE, OF BOSTON, MASSACHUSETTS.

APPARATUS FOR PURIFYING WATER.

SPECIFICATION forming part of Letters Patent No. 411,292, dated September 17, 1889.

Application filed January 2, 1889. Serial No. 295,241. (No model.)

*To all whom it may concern:*

Be it known that I, FREDERIC H. MOORE, a citizen of the United States, residing at Boston, in the county of Suffolk and State of Massachusetts, have invented certain new and useful Improvements in Apparatus for Purifying Water, of which the following, taken in connection with the accompanying drawings, is a specification.

The object of my invention is to produce an effective apparatus for purifying water by distilling and aerating the same, so that it will be almost, if not entirely, free from animal, vegetable, or other impurities.

The invention consists of a boiler for vaporizing the water, said boiler being connected to the upper end of a worm or coil situated in a condensing-vessel which is supplied with cold water, the other end of the worm being connected to a pipe leading to an aerating vessel or jar provided with a number of holes at its upper end, and also fitted with a series of perforated shelves, through each of which the condensed water passes in small drops, so that every particle of the water comes into contact with the atmospheric air before it reaches the reservoir, from which it is drawn off as required.

Referring to the accompanying drawings, Figure 1 represents a side elevation of a water-purifying apparatus embodying my invention. Fig. 2 is a vertical longitudinal section through the same. Fig. 3 is a view of one of the shelves in the aerating-vessel, and Fig. 4 is a view of the under side of the cover for the same.

A represents a cylindrical boiler supported upon and heated by a gas-stove B.

$a$ is the water-supply, and $b$ a water-gage. The upper portion of the boiler is dome-shaped, and is connected by a pipe C to the upper end of a worm or coil D, situated in a condensing-vessel E, which is supported on the top of the boiler A by a perforated collar or stand F. The other end of the worm or coil D is connected by a pipe G to an aerating vessel or jar H. The condensing-vessel E is kept full of cold water, which enters it by the supply-pipe $c$ and escapes by the overflow-pipe $d$. It is also provided with a faucet $e$, by which it can be emptied when desired. The pipes $a$ $c$ $d$ may, where practicable, be connected with the water-service of the building and provided with all necessary cocks and valves.

The upper portion of the aerating-vessel H is provided with a series of shelves J. These shelves are supported upon small lugs $j$, secured to the inner side of the vessel H, and the center of each shelf is formed dish-shaped, as shown, and they are also perforated with a number of small holes. The outer edges of the shelves are preferably turned up to prevent any water escaping over them. Just above the level of each shelf a number of large holes $k$ are formed in the aerating-vessel H, so that the atmospheric air can pass freely through the same.

The cover $h$ of the aerating-vessel H is provided near its outer edge with a number of holes $k'$, and in its center it is fitted with a small strainer $m$, which is so connected that it can be easily removed when required. The pipe G from the worm enters the cover above the strainer $m$.

K is a cock for drawing off the purified water when required.

The aerating-vessel H stands upon an ice-box L, provided at its upper end with an aperture, so that the cold will come into direct contact with the bottom of the aerating-vessel H, thereby more quickly cooling the purified water therein.

The operation is as follows: The gas-stove being lighted, the water in the boiler A is heated until steam is generated, which passes up the pipe C to the top of the worm or coil D, through which it then passes to the pipe G. Cold water is admitted by the pipe $c$ to the condensing-vessel E, and is caused to circulate around the worm and escape by the pipe $d$, thereby cooling and condensing the steam as it passes through the worm. The condensed water, after leaving the worm D, passes through the pipe G to the aerating-vessel H, which it enters at the cover and passes in small drops through the strainer $m$ onto the upper shelf $k$, and thence through said shelf in small drops to the next shelf, and so on until it reaches the lower portion of the vessel H, from which it can be drawn off by the cock K. As the water passes from the strainer to the top shelf, and thence from shelf to shelf, it is constantly broken up into small particles, and as air is freely admitted through the holes k k' every particle is brought into direct contact with the atmosphere and becomes properly charged with air. It will be seen that water thus treated is purified by evaporation and then aerated, thereby producing a water that is pure and at the same time agreeable to the taste.

If desired, small pieces of marble or other purifying or charging compounds may be placed in the strainer m and on the shelves J, thereby more effectually aerating and purifying the water as it percolates through the same.

Instead of heating the boiler A by a gas-stove, it may be placed upon and be heated by an ordinary stove or range, and in places where steam is employed for heating or other purposes the steam may be taken directly from the boiler used for producing said steam.

What I claim as my invention is—

1. An aerating-vessel provided with a series of dish-shaped perforated shelves at its upper end, and a series of holes through the wall of the vessel just above the level of each of the shelves for the admission of atmospheric air jointly with a water-distilling apparatus, and a pipe connecting the distilling apparatus and the upper end of the aerating-vessel, substantially as and for the purposes set forth.

2. In a water-distilling apparatus, a boiler, a worm or coil communicating therewith and inclosed within a condensing-vessel supplied with cold water jointly with an aerating-vessel provided with a series of perforated dish-shaped shelves and holes for the admission of atmospheric air, and a strainer on the under side of the cover, and a pipe connecting the cover with the worm for conducting the condensed water thereto, substantially as shown and described.

3. In a water-distilling apparatus, a boiler, a worm or coil communicating therewith and inclosed within a condensing-vessel supplied with cold water jointly with an aerating-vessel having a series of dish-shaped perforated shelves at its upper end and a series of holes through the wall of the vessel just above the level of each of the shelves for the admission of atmospheric air, an ice-box, and a pipe connecting the coil with said aerating-vessel, substantially as and for the purposes set forth.

In testimony whereof I have signed my name to this specification, in the presence of two subscribing witnesses, on this 31st day of December, A. D. 1888.

FREDERIC H. MOORE.

Witnesses:
 CHAS. STEERE,
 EDWIN PLANTA.